(12) United States Patent
Berard et al.

(10) Patent No.: US 10,927,894 B2
(45) Date of Patent: Feb. 23, 2021

(54) ROLLER BEARING WITH LUBRICATION CHANNEL

(71) Applicant: SKF Aerospace France S.A.S, Montigny-le-Bretonneux (FR)

(72) Inventors: Sebastien Berard, Valence (FR); Jean-Philippe Clauvelin, Valence (FR); Jean-Philippe Deprugney, Beauchastel (FR); Vincent Guyard, Assieu (FR); Philippe Mathieux, Condamine (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/708,632

(22) Filed: Dec. 10, 2019

(65) Prior Publication Data
US 2020/0191203 A1 Jun. 18, 2020

(30) Foreign Application Priority Data

Dec. 17, 2018 (FR) ...................... 18 73049

(51) Int. Cl.
*F16C 33/66* (2006.01)
*F16C 19/26* (2006.01)
*F16C 33/58* (2006.01)

(52) U.S. Cl.
CPC .......... *F16C 33/6677* (2013.01); *F16C 19/26* (2013.01); *F16C 33/586* (2013.01); *F16C 33/6681* (2013.01); *F16C 33/585* (2013.01)

(58) Field of Classification Search
CPC .............. F16C 33/6659; F16C 33/6677; F16C 33/6681; F16C 19/26; F16C 33/585; F16C 33/586
See application file for complete search history.

(56) References Cited

U.S. PATENT DOCUMENTS

| 4,194,797 A | * | 3/1980 | Hormann | ............ F16C 33/6677 29/898.066 |
| 4,334,720 A | | 6/1982 | Signer | |
| 4,384,749 A | | 5/1983 | Schaefer | |

(Continued)

FOREIGN PATENT DOCUMENTS

| CN | 201347951 Y | 11/2009 |
| EP | 1640627 A1 | 3/2006 |

(Continued)

OTHER PUBLICATIONS

Machine Translation of JP-2006022889-A (Year: 2006).*

*Primary Examiner* — Alan B Waits
(74) *Attorney, Agent, or Firm* — Garcia-Zamor Intellectual Property Law; Ruy Garcia-Zamor; Bryan Peckjian

(57) ABSTRACT

A roller bearing having a first race, a second race, the races being coaxial and in relative rotation about a central axis, and a row of rollers. The first race including a circumferential groove disposed on a surface radially opposite the first bearing track, and at least one hole traversing the race substantially radially and opening out close to the first bearing track. The first race also provides a secondary groove extending in a substantially radial direction and connecting the circumferential groove to the hole. As such, it is possible for lubricant to be transferred from the circumferential groove to the hole via the secondary groove.

6 Claims, 4 Drawing Sheets

(56) References Cited

U.S. PATENT DOCUMENTS

| | | | |
|---|---|---|---|
| 4,428,628 A * | 1/1984 | Brown | F16C 19/28 |
| | | | 384/467 |
| 4,916,750 A | 4/1990 | Scott | |
| 5,749,660 A * | 5/1998 | Dusserre-Telmon | F16C 19/166 |
| | | | 384/475 |
| 6,015,237 A | 1/2000 | Ogawa | |
| 10,174,791 B2 * | 1/2019 | Beauvais | F16C 33/586 |
| 2006/0062504 A1 * | 3/2006 | Wilton | F01D 25/18 |
| | | | 384/475 |

FOREIGN PATENT DOCUMENTS

| | | | | |
|---|---|---|---|---|
| EP | 2886894 A1 | 6/2015 | | |
| FR | 3022587 A1 | 12/2015 | | |
| JP | 0594531 A | 4/1993 | | |
| JP | 0968232 A | 3/1997 | | |
| JP | 2006022889 A * | 1/2006 | | F16C 33/6677 |
| JP | 2008133898 A | 6/2008 | | |

* cited by examiner

ROLLER BEARING WITH LUBRICATION CHANNEL

TECHNICAL FIELD OF THE INVENTION

The present invention relates to the field of roller bearings for any kind of application requiring such bearings, for example motor vehicles, combustion engines or electric motors, torque-transmission elements, etc.

BACKGROUND OF THE INVENTION

The service life of a mechanical system that has moving parts, such as a bearing, is essentially linked to lubrication of the members. A lubrication defect generally leads to a rapid deterioration and to failure of the members and hence of the system. Mechanical systems customarily comprise surfaces in mechanical contact which may be lubricated by lubricant, for example grease or oil, initially placed inside the mechanical system. In the long term, however, the mixing of the lubricant, in association with its ageing and with the heating cycles to which the members are subjected, give rise to a degradation in the grease. This may lead to a premature deterioration in the moving parts, an increase in the temperature of the mechanical system and a drop in the efficiency of the system.

With a view to obviating these drawbacks, it is known in the prior art to carry out regular maintenance operations consisting in a re-greasing of the mechanical system. In the specific field of roller bearings, the publication U.S. Pat. No. 4,916,750A describes a bearing comprising an inner race with an inner roller track, an outer race with an outer roller track, and a row of rollers in a bearing chamber defined between the roller tracks, the outer race being provided with through-holes allowing lubricant to be transferred from the exterior of the bearing to the bearing chamber.

In prior publication U.S. Pat. No. 4,384,749A, holes traverse the inner race of the bearing and open out in the bearing chamber in a groove formed in a corner between the inner bearing track and an axial holding edge for the rollers. In JPH0968232, a plurality of through-holes are connected by a groove provided at the circumference of the interior cylindrical bore of the inner race.

Nevertheless, it is desirable to improve the means whereby lubricant is transferred via a race of the bearing and towards the bearing chamber, with a view to reducing the number of operations in the phase of manufacturing the race and to offering means allowing efficient transfer.

SUMMARY OF THE INVENTION

More particularly, it is an object of the present invention to provide a roller bearing that has an enhanced service life, is simpler in terms of design and manufacture, and less expensive to produce.

The invention relates to a roller bearing comprising a first race provided with a first bearing track framed axially by two edges, a second race provided with a second bearing track, the races being coaxial and in relative rotation about a central axis. The bearing also comprises a row of rollers housed radially between the first and second bearing tracks and axially between the edges.

The first race comprises a circumferential groove provided on a surface radially opposite the first bearing track, and at least one hole traversing the race substantially radially and opening out close to the first bearing track.

According to the invention, the first race also comprises a secondary groove extending in a substantially radial direction and connecting the circumferential groove to the hole, it being possible for lubricant to be transferred from the circumferential groove to the hole via the secondary groove.

By virtue of the invention, a plurality of holes may be provided through one of the races of the bearing, opening out in a bearing chamber in which the row of rollers is housed. This plurality of holes are all connected fluidically to one and the same circumferential groove for transferring lubricant, each of the holes being connected to the circumferential groove by a secondary groove. The circumferential groove thus forms a principal means for transferring lubricant, the secondary grooves and the holes forming secondary means for transfer towards the bearing chamber.

According to other features of the invention that are advantageous but not mandatory, considered in isolation or in combination:

The first race also comprises two edges extending essentially radially and axially framing the first bearing track such as to form axial stops for the rollers.

Sealing means are interposed between the races, the rollers being axially framed by the sealing means.

The circumferential groove is centred axially relative to the row of rollers.

The first race is an inner race, the circumferential groove being formed in a bore of the race, and the second race is an outer race.

The secondary groove extends strictly axially.

The secondary groove extends obliquely in an intersecting plane passing through the central axis.

The hole opens out into a connecting fillet formed between the first bearing track and one of the edges.

The fillet forms an annular groove.

The first race comprises at least one series of holes distributed circumferentially.

The first race comprises two series of holes distributed circumferentially, each of the holes in a first series opening out in a first fillet formed between the bearing track and a first edge, and each of the holes in a second series opening out in a second fillet formed between the bearing track and a second edge.

The holes of the two series are aligned axially in pairs.

The holes of the two series are circumferentially offset.

BRIEF DESCRIPTION OF THE FIGURES

The present invention will be better understood from studying the detailed description of embodiments given by way of entirely non-limiting example and illustrated by the appended drawings.

DETAILED DESCRIPTION OF THE INVENTION

Figure 1:
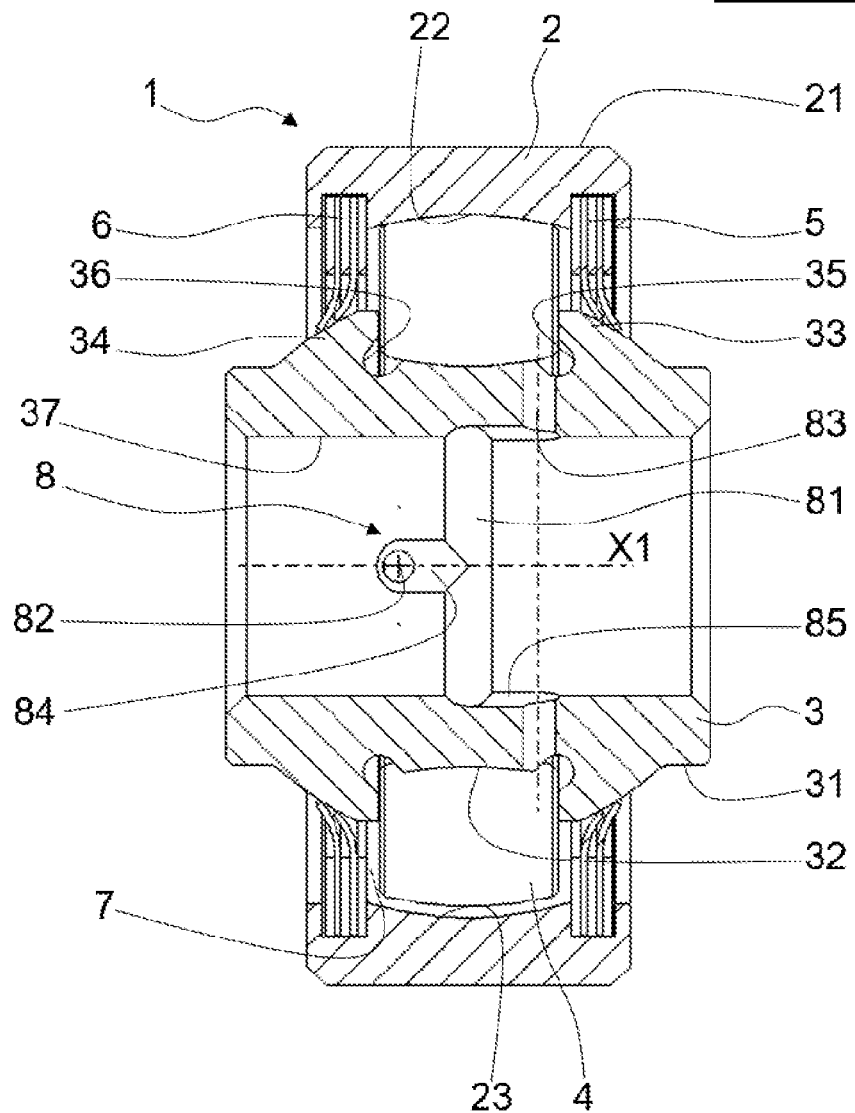
FIG. 1 is a view in axial section of a bearing in accordance with a first embodiment of the invention.

A bearing 1 with central axis X1 comprises an outer race 2, an inner race 3, a row of rollers 4 and two leak tight seals 5 and 6.

The races 2, 3 are coaxial and in relative rotation about the central axis X1 in normal operating mode.

The outer race 2 comprises a cylindrical exterior surface 21, a bore 22 in which is provided a bearing track 23 for the rollers 4 and grooves in which the leak tight seals 5, 6 are fitted, the seals forming static leak tightness with the turning outer race 2.

The inner race 3 comprises an exterior surface 31 in which is provided a bearing track 32 for the rollers 4. The exterior surface 31 is also provided with two edges 33, 34 extending radially in the direction of the outer race 2, the edges 33, 34 axially framing the bearing track 32 such as to form axial stops for the rollers 4. Connecting fillets 35, 36 are formed at the axial ends of the bearing track 32 and the edges 33, 34, respectively. These fillets 35, 36 each have the form of an annular groove.

The leak tight seals 5 and 6 each comprise leak tight lips in sliding contact with a portion of the edges 33 and 34, respectively, the seals forming a dynamic leak tightness with the non-turning inner race 3.

The inner race 3 also comprises an essentially cylindrical through-bore 37. For example, a pin or support may be inserted into the bore 37.

Alternatively, the inner race 3 may be a turning race and the outer race 2 a non-turning race, or else both races may be able to turn relative to one another.

The bearing track 32 of the inner race 3, the bearing track 23 of the outer race 2, the edges 33, 34 of the inner race 3, and the seals 5, 6 define a bearing chamber 7 in which the rollers 4 move, between the races 2, 3. The bearing chamber 7 is filled with lubricant, for example grease or oil, in order to reduce friction between the contact surfaces of the moving elements—the rollers 4, in this case—and the bearing tracks 23, 32.

The inner race 3 comprises mean 8 for transferring lubricant to the bearing chamber 7.

The means 8 comprise a circumferential groove 81 formed in the bore 37 of the inner race 3. This circumferential groove 81 is provided on a surface 37 radially opposite the bearing track 32. As illustrated in FIG. 1, the circumferential groove 81 is centred axially relative to the row of rollers 4.

The means 8 also comprise a first series 82 of through-holes and a second series 83 of through-holes. Each of the holes 82, 83 traverses the inner race substantially radially, from the bore 37, and opens out into a fillet 35, 36, respectively, close to the bearing track 32.

In the embodiment illustrated in FIG. 1, the holes 82, 83 of the two series are offset relative to one another in the circumferential direction.

According to the invention, the means 8 also comprise a first series 84 of secondary grooves, each of these secondary grooves extending in a radial direction and connecting the circumferential groove 81 to one of the holes in the first series 82. The means 8 also comprise a second series 85 of secondary grooves, each of these secondary grooves extending in a radial direction and connecting the circumferential groove 81 to one of the holes in the second series 83.

In the embodiment illustrated in FIG. 1, the secondary grooves 84, 85 each extend strictly in the axial direction, the grooves in the first and second series thus being offset relative to one another in the circumferential direction.

Lubricant may thus be transferred from the circumferential groove 81 to each of the holes 82, 83 opening out in the bearing chamber 7 via the secondary grooves 84, 85.

Figure 2:
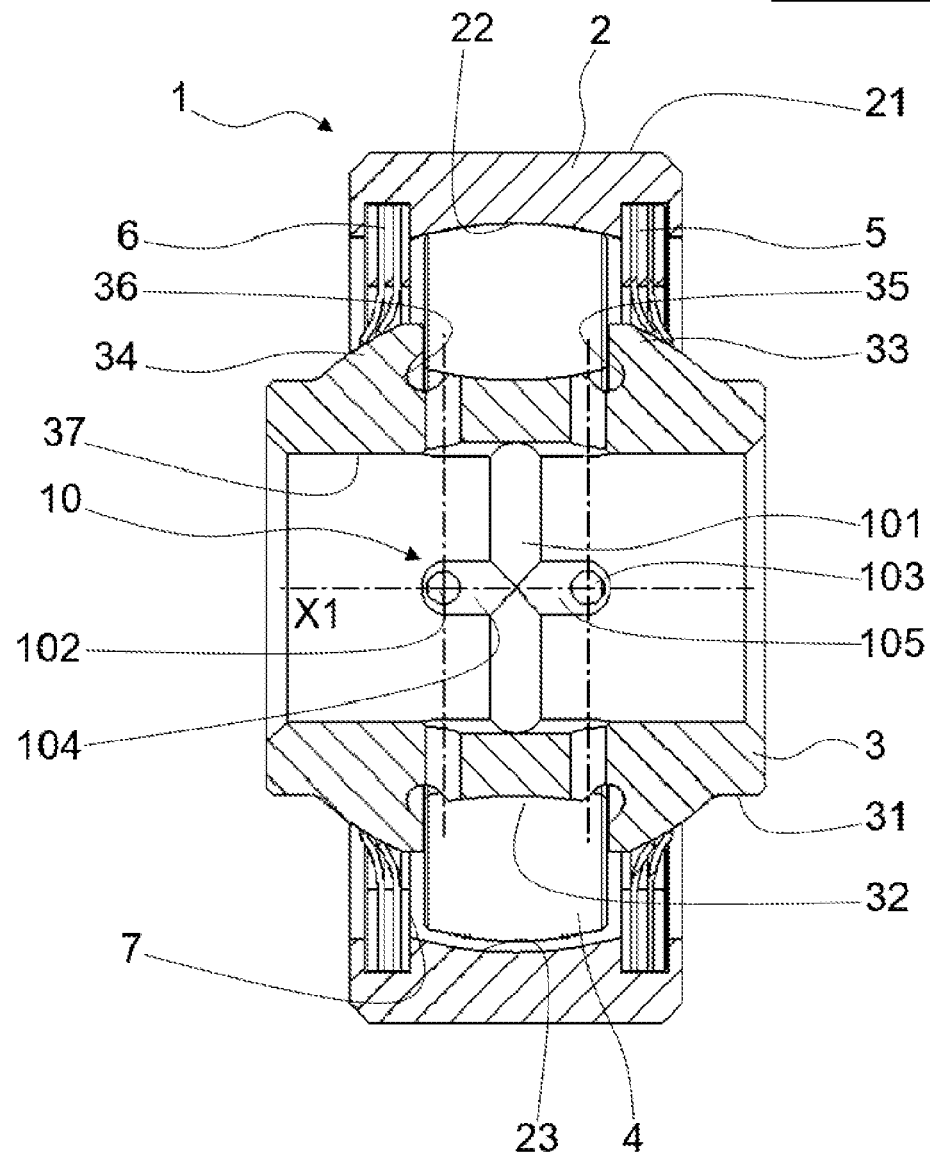
FIG. 2 is a view in axial section of a bearing in accordance with a second embodiment of the invention.

A second embodiment of the roller bearing 1 is illustrated in FIG. 2 and differs from the first embodiment in that the inner race 3 comprises lubricant-transfer means 10 with two series 102, 103 of through-holes aligned axially in pairs.

The means 10 comprise a circumferential groove 101 formed in the bore 37 of the inner race 3. This circumferential groove 101 is centred axially relative to the row of rollers 4. The means 10 also comprise a first series 102 of through-holes and a second series 103 of through-holes. Each of the holes 102, 103 traverses the inner race substantially radially, from the bore 37, and opens out into a fillet 35, 36, respectively, close to the bearing track 32.

In the embodiment illustrated in FIG. 2, the holes 102, 103 of the two series are aligned axially in pairs.

According to the invention, the means 10 also comprise a first series 104 of secondary grooves, each of these secondary grooves extending in a radial direction and connecting the circumferential groove 101 to one of the holes in the first series 102. The means 10 also comprise a second series 105 of secondary grooves, each of these secondary grooves extending in a radial direction and connecting the circumferential groove 101 to one of the holes in the second series 103.

In the embodiment illustrated in FIG. 2, the secondary grooves 104, 105 each extend strictly in the axial direction, the grooves in the first and second series thus being aligned in pairs in the axial direction.

A third embodiment of the roller bearing 1 is illustrated in FIG. 2 and differs from the first embodiment in that the inner race 3 comprises lubricant-transfer means 20 with two series 204, 205 of oblique secondary grooves.

The means 20 comprise a circumferential groove 201 formed in the bore 37 of the inner race 3. This circumferential groove 201 is centred axially relative to the row of rollers 4. The means 20 also comprise two series 202, 203 of through-holes similar to those described in FIG. 1. In the embodiment illustrated in FIG. 3, the holes 202, 203 of the two series are offset relative to one another in the circumferential direction.

Figure 3:
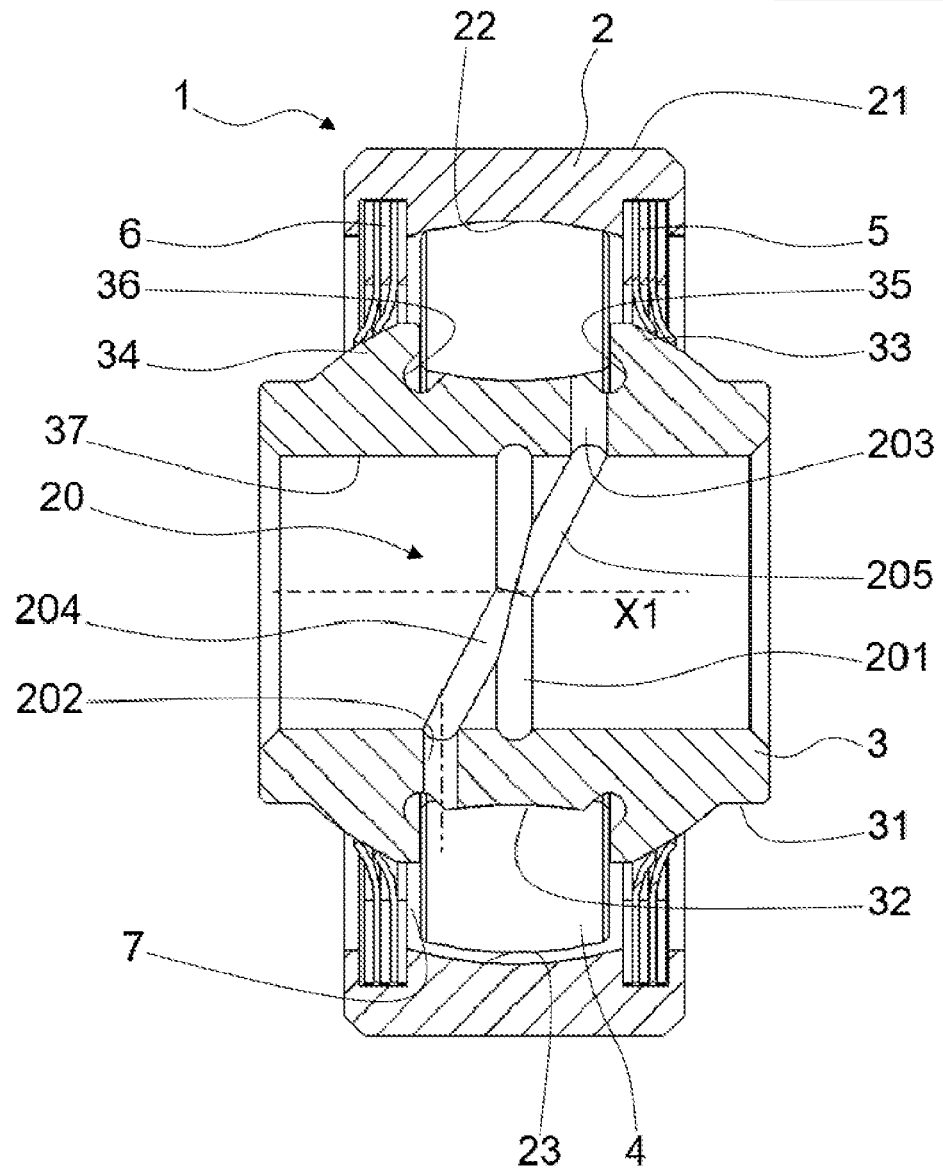
FIG. 3 is a view in axial section of a bearing in accordance with a third embodiment of the invention.

In the embodiment illustrated in FIG. 3, the means 20 comprise two series 204, 205 of secondary grooves. Each of these secondary grooves 204, 205 extend obliquely in an intersecting plane in axial section such as to connect the circumferential groove 201 to the holes 202, 203 that are offset circumferentially.

Figure 4:
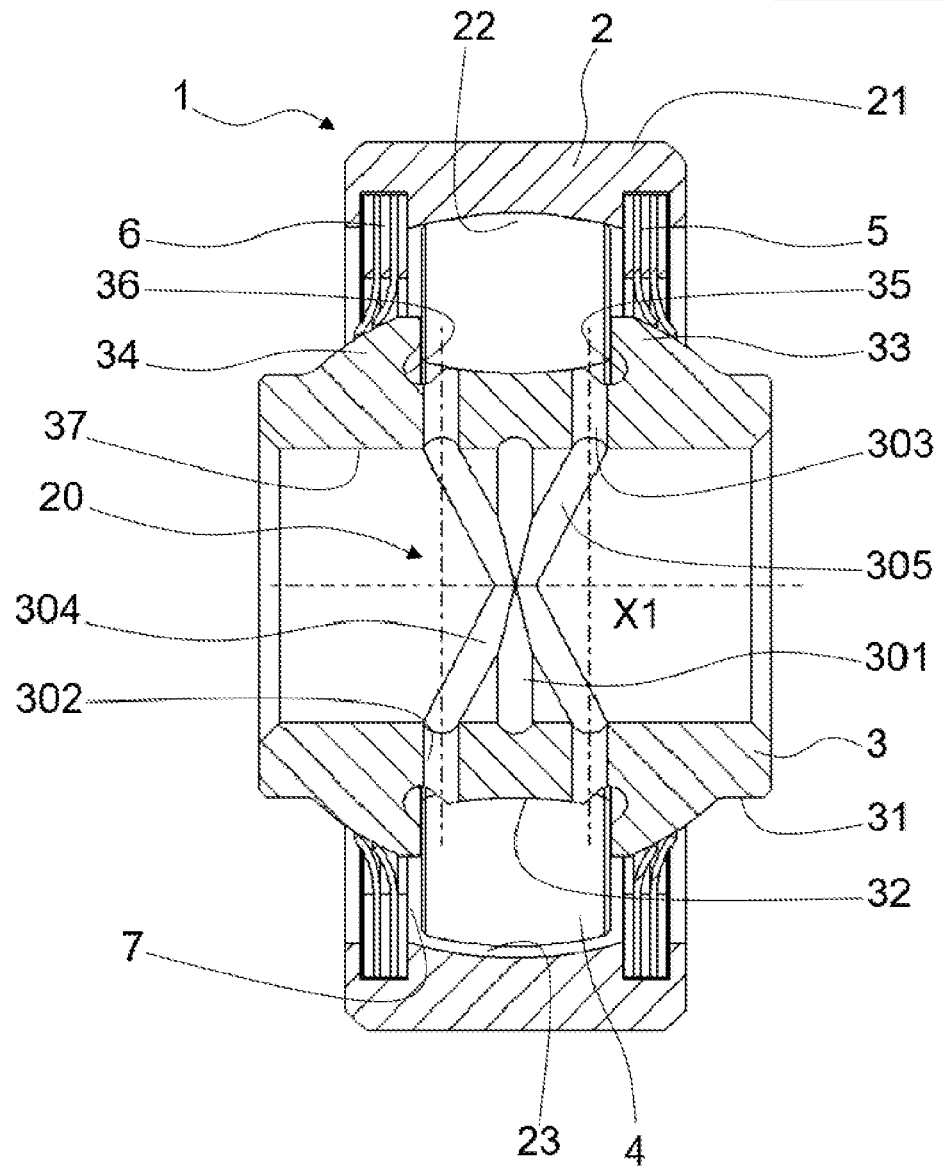
FIG. 4 is a view in axial section of a bearing in accordance with a first embodiment of the invention.

In a fourth embodiment illustrated in FIG. 4, the inner race 3 comprises lubricant-transfer means 30 with two series 302, 303 of holes aligned axially in pairs and two series of secondary grooves extending obliquely in an intersecting plane in axial section such as to connect the holes 202, 203 to a circumferential groove 301 centred axially relative to the rollers 4.

Furthermore, all or only some of the technical features of the various embodiments may be combined with one another. The bearing may thus be adapted in terms of costs, performance and simplicity of implementation.

The invention claimed is:
1. A roller bearing comprising:
a first race provided with a first bearing track,
a second race provided with a second bearing track, the first and second races being coaxial and in relative rotation about a central axis,
a row of rollers housed radially between the first and second bearing tracks,
the first race also having a circumferential groove provided on a surface radially opposite to the first bearing track, wherein the circumferential groove is centered axially relative to the row of rollers, at least one hole traversing the first race substantially radially and opening proximate to the first bearing track, and the first race also provides a secondary groove which, when viewed in a cross-section in a plane which includes the central axis, extends along the surface radially opposite the first bearing race in a direction which is oblique relative to the central axis, the secondary groove connecting the circumferential groove to the at least one hole such that lubricant can be transferred from the circumferential groove to the at least one hole via the secondary groove, wherein the first race, when viewed in cross-section, also comprises two edge protuberances extending radially on opposite axial sides of the first race such that the two edge protuberances form axial stops for the rollers.

2. The roller bearing of claim 1, wherein, on a side of the first bearing track of the first race, the at least one hole opens in a connecting fillet formed between the first bearing track and one of the two edge protuberances.

3. The roller bearing of claim 2, wherein the connecting fillet forms an annular groove.

4. The roller bearing of claim 1, wherein the at least one hole comprises two series of holes distributed circumferentially along the first race each opening between the first bearing track and one of the two edge protuberances.

5. The roller bearing of claim 4, wherein the holes of the two series of holes are aligned axially in pairs.

6. The roller bearing of claim 4, wherein the holes of the two series of holes are circumferentially offset.

* * * * *